United States Patent
Mei

(10) Patent No.: US 8,288,953 B1
(45) Date of Patent: Oct. 16, 2012

(54) BUCK CONSTANT AVERAGE CURRENT REGULATION OF LIGHT EMITTING DIODES

(75) Inventor: Tawen Mei, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 274 days.

(21) Appl. No.: 12/657,368

(22) Filed: Jan. 19, 2010

(51) Int. Cl.
    *H05B 37/02* (2006.01)
(52) U.S. Cl. ............... 315/209 R; 315/343; 315/291; 315/294; 315/297; 363/21.1; 323/272; 323/282; 323/283; 323/284; 323/285
(58) Field of Classification Search .......... 315/291, 315/294, 297, 343, 209 R, 307, 312; 327/94; 363/21.1, 21.11, 12.18, 26, 41; 323/272, 323/282, 283, 284, 285
    See application file for complete search history.

(56) References Cited

U.S. PATENT DOCUMENTS

| | | | |
|---|---|---|---|
| 5,570,055 A | 10/1996 | Gilbert | |
| 5,877,645 A | 3/1999 | Comino et al. | |
| 6,172,492 B1 | 1/2001 | Pletcher et al. | |
| 6,259,313 B1 | 7/2001 | Lewicki | |
| 6,606,257 B2 | 8/2003 | Bourdillon | |
| 6,683,419 B2 | 1/2004 | Kriparos | |
| 6,798,152 B2 | 9/2004 | Rooke et al. | |
| 6,844,760 B2 | 1/2005 | Koharagi et al. | |
| 6,871,289 B2 | 3/2005 | Pullen et al. | |
| 7,034,512 B2 | 4/2006 | Xu et al. | |
| 7,058,373 B2 | 6/2006 | Grigore | |
| 7,115,888 B2 | 10/2006 | Hachiya et al. | |
| 7,119,498 B2 | 10/2006 | Baldwin et al. | |
| 7,132,820 B2 | 11/2006 | Walters et al. | |
| 7,132,883 B2 | 11/2006 | Huijsing et al. | |
| 7,170,267 B1 | 1/2007 | McJimsey | |
| 7,180,274 B2 | 2/2007 | Chen et al. | |
| 7,196,503 B2 | 3/2007 | Wood et al. | |
| 7,250,744 B2 | 7/2007 | Weng | |
| 7,268,609 B2 | 9/2007 | van Staveren et al. | |
| 7,388,359 B1* | 6/2008 | Ling | 323/284 |

(Continued)

OTHER PUBLICATIONS

Yuri Panov et al., "Adaptive Off-Time Control for Variable-Frequency, Soft-Switched Flyback Converter at Light Loads", IEEE Transactions on Power Electronics, vol. 17, No. 4, Jul. 2002, pp. 596-603.

(Continued)

*Primary Examiner* — Douglas W Owens
*Assistant Examiner* — Jonathan Cooper
(74) *Attorney, Agent, or Firm* — Alan A. R. Cooper; Wade James Brady, III; Frederick J. Telecky, Jr.

(57) ABSTRACT

An apparatus includes pulse width modulation (PWM) circuitry configured to generate a PWM signal based on a feedback voltage associated with current flowing through a load, such as one or more light emitting diodes (LEDs). The apparatus also includes a power switch configured to control the current flowing through the load on the PWM signal. The apparatus further includes averaging circuitry configured to provide an average of the feedback voltage to the PWM circuitry. The averaging circuitry is may be configured to provide the feedback voltage to the PWM circuitry during a first phase of operation and to provide the average of the feedback voltage to the PWM circuitry during a second phase of operation. The average of the feedback voltage may be referenced to a reference voltage received by an error amplifier in the PWM circuitry during both the first and second phases of operation.

22 Claims, 4 Drawing Sheets

U.S. PATENT DOCUMENTS

| | | | |
|---|---|---|---|
| 7,425,819 B2 | 9/2008 | Isobe | |
| 7,443,209 B2 | 10/2008 | Chang | |
| 7,486,063 B1 | 2/2009 | Gu et al. | |
| 7,595,622 B1 | 9/2009 | Tomiyoshi et al. | |
| 7,710,084 B1* | 5/2010 | Guo | 323/224 |
| 7,796,365 B2 | 9/2010 | Isham | |
| 2003/0080723 A1 | 5/2003 | Chen et al. | |
| 2006/0017424 A1* | 1/2006 | Wood et al. | 323/274 |
| 2007/0080674 A1 | 4/2007 | Gray et al. | |
| 2007/0275684 A1* | 11/2007 | Harada et al. | 455/185.1 |

OTHER PUBLICATIONS

In-Hwan Oh, "An Analysis of Current Accuracies in Peak and Hysteretic Current Controlled Power LED Drivers", 2008 IEEE, pp. 572-577.

K. Zhou et al., "Qusi-Active Power Factor Correction Circuit for HB LED Driver", 2007 IEEE, pp. 193-197.

"LM3402/LM3402HV 0.5A Constant Current Buck Regulator for Driving High Power LEDs" National Semiconductor, Oct. 2006, 22 pages.

"LM3402 Design Document", National Semiconductor, Sep. 2006, 2 pages.

"LM3404/04HV 1.0A Constant Current Buck Regulator for Driving High Power LEDs", National Semiconductor, Jun. 2007, 24 pages.

"LM3404/04HV 1.0A Constant Current Buck Regulator for Driving High Power LEDs", National Semiconductor, Oct. 2006, 2 pages.

Matthew Reynolds, "LM3402/LM3404 Fast Dimming and True Constant LED Current Evaluation Board", National Semiconductor, Jul. 24, 2008, 18 pages.

T. Suntio et al., "Dynamic Effects of Inductor Current Ripple in Average Current Mode Control", 2001 IEEE, pp. 1259-1264.

Zaohong Yang et al., "DC-To-DC Buck Converters with Novel Current Mode Control", 1999 IEEE, pp. 1158-1164.

Dale R. Eagar, et al., Current Mode Switcher Having Novel Switch Mode Control Topology and Related Method, U.S. Appl. No. 12/198,750, filed Aug. 26, 2008.

"PWM LED Driver and Boost, Flyback and SEPIC Controller", Linear Technology Corporation 2005, 24 pages.

"Constant Current LED Driver with Digital and PWM Brightness Control", Texas Instruments, Nov. 2004, 25 pages.

Prathyusha Narra, et al., "An Effective LED Dimming Approach", 2004 IEEE, p. 1671-1676.

Lawrence Hok-Sun Ling, "System and Method for Providing a Pulsating Current Output Having Ultra Fast Rise and Fall Times", U.S. Appl. No. 11/731,961, filed Apr. 2, 2007.

Tawen Mei, et al., "Circuit and Method for Average-Current Regulation of Light Emitting Diodes", U.S. Appl. No. 11/703,981, filed Feb. 8, 2007.

* cited by examiner

BUCK CONSTANT AVERAGE CURRENT REGULATION OF LIGHT EMITTING DIODES

TECHNICAL FIELD

This disclosure is generally directed to regulators for light emitting diodes (LEDs). More specifically, this disclosure relates to buck constant average current regulation of LEDs.

BACKGROUND

Many devices use light emitting diodes (LEDs), such as flashlights, traffic control signals, flat panel displays, mobile telephone displays, vehicle taillights, and light bulbs. The LEDs are typically current-driven devices, meaning the LEDs are controlled by regulating the amount of current flowing through the LEDs. Ideally, the current supplied to one or more LEDs is controlled at a minimal cost.

LED control has often involved regulating the peak current through the LEDs. While other LED control techniques have attempted to control the average current through the LEDs, these techniques often suffer from various disadvantages. These disadvantages have included poor transient response, excessive die space, and limitations on operating frequencies, input voltages, and output voltages.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
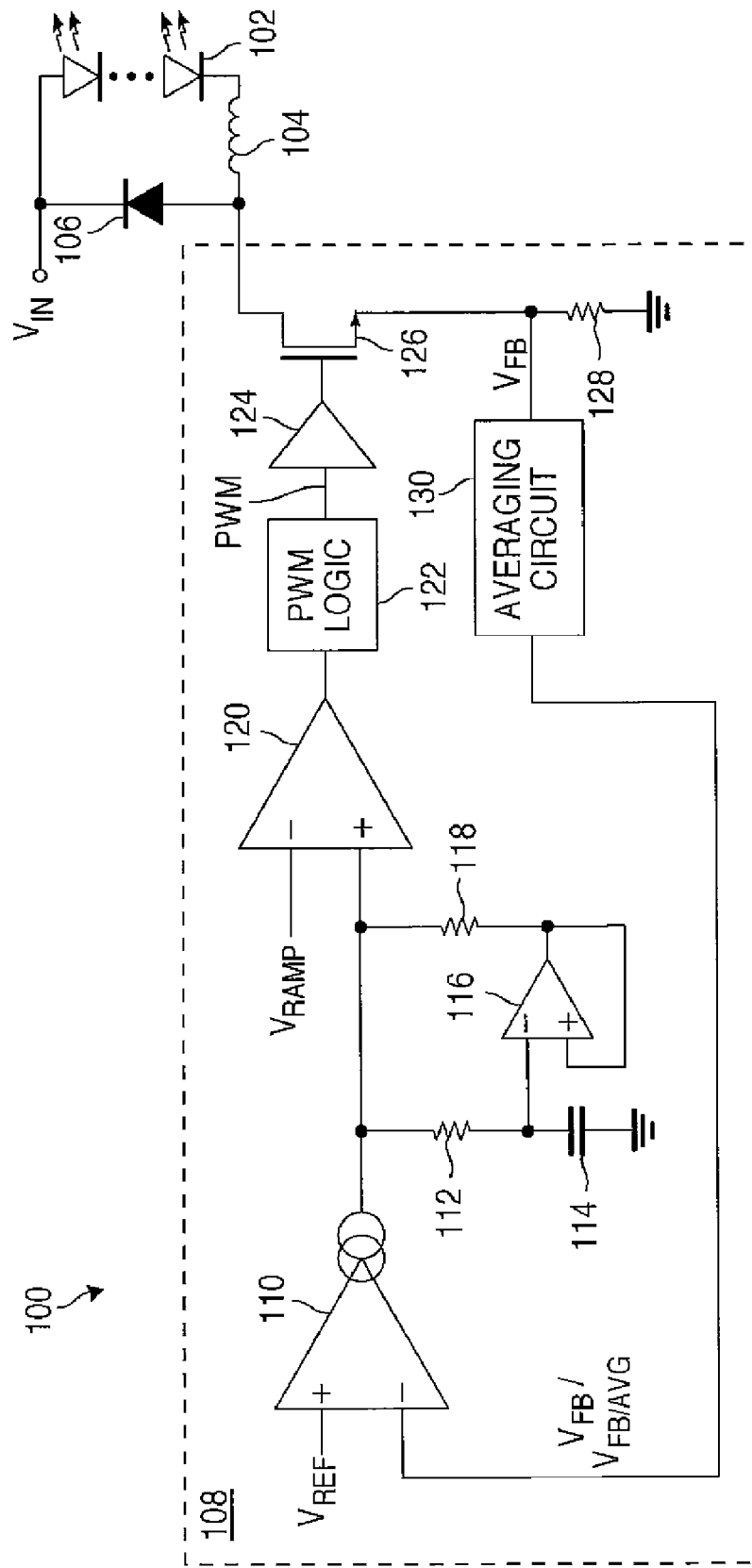
FIG. 1 illustrates an example system for regulating light emitting diodes (LEDs) according to this disclosure.

FIG. 1 illustrates an example system 100 for regulating light emitting diodes (LEDs) according to this disclosure. As shown in FIG. 1, the system 100 drives one or more LEDs 102, which are coupled in series. Any number of LEDs 102 could be used in the system 100. Each LED 102 represents any suitable semiconductor structure for generating visible light or other illumination. The LEDs 102 are coupled to an input voltage source that provides an input voltage $V_{IN}$, which can be used to create a current through the LEDs 102. The input voltage source can provide any suitable input voltage $V_{IN}$, such as 12V.

The LEDs 102 are coupled to an inductor 104 and a diode 106. The inductor 104 represents any suitable inductive structure having any suitable inductance, such as 10pH. The diode 106 represents a recirculating diode and can include any suitable structure that substantially limits current flow in one direction.

The LEDs 102 are regulated by an LED driver circuit 108, which is coupled to the inductor 104 and the diode 106. As described in more detail below, the driver circuit 108 represents a floating average current buck regulator. The driver circuit 108 regulates the average current flowing through the LEDs 102, where the average current is referenced to the input voltage $V_{IN}$. The driver circuit 108 represents a buck regulator since the voltage imposed on the LEDs 102 is not greater than the input voltage $V_{IN}$.

In this example, the driver circuit 108 includes an error amplifier 110, which receives two inputs and amplifies a difference or error between those inputs. In this embodiment, the error amplifier 110 receives a reference voltage $V_{REF}$ and a feedback voltage $V_{FB}$ or an average feedback voltage $V_{FB\_AVG}$ and the error amplifier 110 generates an output based on a difference between the input voltages. The reference voltage $V_{REF}$ could represent any suitable voltage, such as 0.2V. The error amplifier 110 includes any suitable structure for amplifying a difference between input signals, such as a transconductance amplifier.

An output of the error amplifier 110 is coupled to a resistor 112, which is coupled to a capacitor 114. The resistor 112 represents any suitable resistive structure having any suitable resistance, such as 637kΩ. The capacitor 114 represents any suitable capacitive structure having any suitable capacitance, such as 5 pF. The resistor 112 and capacitor 114 are coupled to the inverting input of an amplifier 116, which has an output coupled to its non-inverting input and to a resistor 118. The amplifier 116 represents any suitable structure for amplifying a signal. The resistor 118 represents any suitable resistive structure having any suitable resistance, such as 13.48 kΩ. These components 112-118 form an active capacitance multiplier.

The output of the error amplifier 110 and the active capacitance multiplier are coupled to the non-inverting input of a comparator 120. The inverting input of the comparator 120 receives a ramp voltage $V_{RAMP}$, which represents a sawtooth voltage that repeatedly increases from a minimum value to a maximum value before being reset to the minimum value. The comparator 120 generates an output signal based on a comparison of its inputs. The comparator 120 includes any suitable structure for comparing input signals.

The output of the comp'arator 120 is coupled to pulse width modulation (PWM) logic 122, which generates a control signal PWM. A duty cycle of the control signal PWM can be adjusted by the PWM logic 122 to control the amount of current flowing through the LEDs 102, which therefore allows the PWM logic 122 to control the illumination generated by the LEDs 102. The PWM logic 122 includes any suitable structure for providing controllable pulse width modulation of a signal. In some embodiments, the PWM logic 122 includes maximum/minimum "on" or "off" timers, which control the maximum and minimum amounts of time that the LEDs 102 can be turned on or off during a control cycle.

The control signal PWM is provided to a driver 124, which uses the control signal PWM to drive a power switch 126. The switch 126 either creates or blocks a path from the LEDs 102 to ground, which therefore controls whether current is flowing through the LEDs 102 (turning the LEDs 102 on) or is not flowing through the LEDs 102 (turning the LEDs 102 off).

The driver 124 represents any suitable structure for driving a switch. The switch 126 represents any suitable switching device, such as an n-channel metal oxide semiconductor (NMOS) transistor.

A resistor 128 is coupled between the switch 126 and ground. When current flows through the LEDs 102, the current also flows through the switch 126 and through the resistor 128. This creates a voltage across the resistor 128, and this voltage represents a feedback voltage $V_{FB}$ that can be used to control the driving of the LEDs 102. The resistor 128 represents any suitable resistive structure having any suitable resistance, such as 0.4Ω.

To support control of the LEDs 102 based on the average current though the LEDs 102, the driver circuit 108 also includes an averaging circuit 130, which can average the feedback voltage $V_{FB}$ to generate an average feedback voltage $V_{FB\_AVG}$. In some embodiments, when the switch 126 is closed (turned on or conducting), the averaging circuit 130 provides the feedback voltage $V_{FB}$ to the error amplifier 110. When the switch 126 is opened (turned off or not conducting), the feedback voltage $V_{FB}$ reaches or approaches zero, but the averaging circuit 130 provides the average feedback voltage $V_{FB\_AVG}$ to the error amplifier 110 during this time. In this way, the error amplifier 110 regulates the average current through the LEDs 102/inductor 104 to control the LEDs 102, while the transconductance of the error amplifier 110 remains substantially constant. Note that the actual current through the LEDs 102/inductor 104 might never become zero during normal operation if the system 100 operates in continuous conduction mode.

Figure 2:
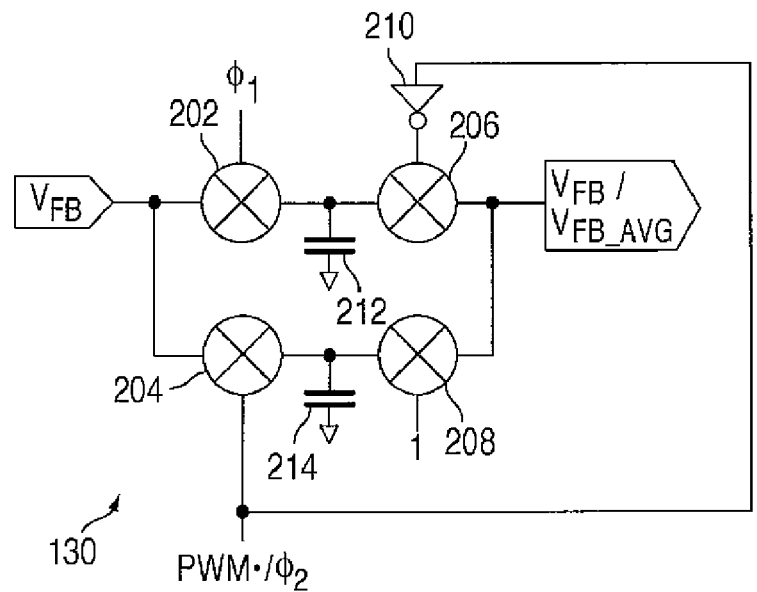
FIG. 2 illustrates an example averaging circuit for use in the system of FIG. 1 according to this disclosure.

The averaging circuit 130 includes any suitable structure for averaging a signal. In particular embodiments, the averaging circuit 130 is implemented using a track-and-average circuit or a sample-and-hold circuit. One example embodiment of the averaging circuit 130 is shown in FIG. 2, which is described below. Also, the LED driver circuit 108 could be implemented in any suitable manner. In particular embodiments, the LED driver circuit 108 is implemented using a single integrated circuit chip.

Although FIG. 1 illustrates one example of a system 100 for regulating LEDs, various changes may be made to FIG. 1. For example, the functional division shown in FIG. 1 is for illustration only. Various components in FIG. 1 could be omitted, combined, or further subdivided and additional components could be added according to particular needs.

FIG. 2 illustrates an example averaging circuit 130 for use in the system 100 of FIG. 1 according to this disclosure. As shown in FIG. 2, the averaging circuit 130 receives the feedback voltage $V_{FB}$ and outputs either the feedback voltage $V_{FB}$ or the average feedback voltage $V_{FB\_AVG}$.

The averaging circuit 130 includes four switches 202-208. The switch 202 is controlled by a first signal $\phi_1$. The switch 204 is controlled by a second signal expressed as PWM'/$\phi_2$ (meaning a logical AND of the signal PWM and an inversion of a signal $\phi_2$), and the switch 206 is controlled by an inversion of the second signal generated by an inverter 210. Here, PWM denotes the control signal PWM from the PWM logic 122, $\phi_1$ denotes a signal with narrow pulses following rising edges of the signal PWM, and $\phi_2$ denotes a signal with narrow pulses preceding falling edges of the signal PWM. The switch 208 is controlled by a fixed value and may be constantly turned on or conducting (it is included so that the characteristics of the two parallel paths in FIG. 2 are similar). A capacitor 212 is coupled between the switches 202 and 206, and a capacitor 214 is coupled between the switches 204 and 208.

Each switch 202-208 includes any suitable switching device, such as a transistor. The inverter 210 includes any suitable structure for inverting a signal. Each capacitor 212-214 includes any suitable capacitive structure having any suitable capacitance.

Figure 3:
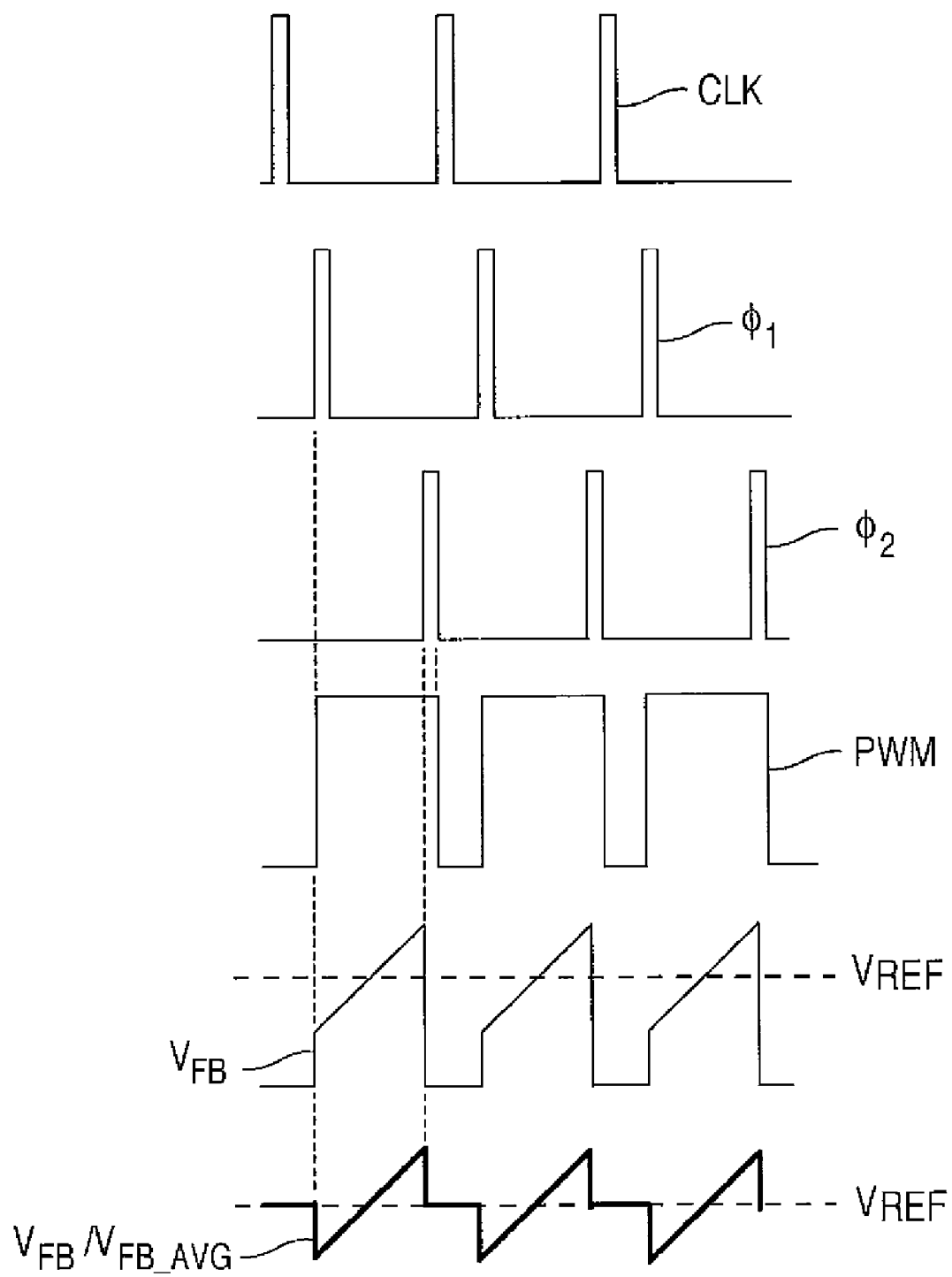
FIG. 3 illustrates example waveforms associated with the averaging circuit of FIG. 2 according to this disclosure.

The operation of the averaging circuit 130 shown in FIG. 2 can be described with respect to FIG. 3, which illustrates example waveforms associated with the averaging circuit 130 of FIG. 2 according to this disclosure. In particular, FIG. 3 illustrates a clock signal CLK, which can be used to generate the $\phi_1$ and $\phi_2$ signals (such as by delaying the clock signal CLK by specified amounts). FIG. 3 also illustrates the $\phi_1$, $\phi_2$, and PWM signals described above. As shown in FIG. 3, each pulse in the $\phi_1$ signal immediately follows a rising edge of the PWM signal, and each pulse in the $\phi_2$ signal immediately precedes a falling edge of the PWM signal.

Using these signals, the averaging circuit 130 may operate as follows. The rising edge of the PWM signal causes the $\phi_1$ signal to assert, which turns on the switch 202. The capacitor 212 tracks and stores the feedback voltage V. The rising edge of the PWM signal also causes the PWM'/$\phi_2$ signal to assert (since the $\phi_2$ signal is de-asserted), which turns on the switch 204. The capacitor 214 also tracks and stores the feedback voltage $V_F$. During this time, the error amplifier 110 receives the feedback voltage $V_{FB}$ on its inverting input.

A brief moment after the $\phi_2$ signal asserts, the PWM and $\phi_2$ signals de-assert, causing the power switch 126 to turn off and causing the switch 206 to turn on. Note that the switch 208 is already turned on. This causes the charges on the capacitors 212-214 to redistribute equally. The error amplifier 110 therefore receives the average voltage that was stored on the capacitors 212-214, which is approximately equal to the average of the feedback voltage $V_{FB}$.

These operations could then be repeated any number of times in a repeating cycle. As shown in FIG. 3, when operated in this manner, the feedback voltage $V_{FB}$ may increase when the PWM signal is asserted and collapse to zero or near zero when the PWM'/$\phi_2$ signal is asserted. However, the output of the averaging circuit 130 (denoted $V_{FB}/V_{FB\_AVG}$ in FIG. 3) is centered around or referenced to the reference voltage $V_{REF}$. The output of the averaging circuit 130 increases when the PWM signal is asserted and tracks the feedback voltage $V_{FB}$. Rather than collapsing to zero, however, the output of the averaging circuit 130 equals the average value of the feedback voltage $V_{FB}$ as stored on the capacitors 212-214 (approximately $V_{REF}$) when the PWM'/$\phi_2$ signal is asserted or the PWM signal is de-asserted. The result is that the output of the averaging circuit 130 remains at or near the reference voltage $V_{REF}$ without collapsing back to zero when the power switch 126 is turned off.

Although FIG. 2 illustrates one example of an averaging circuit 130 and FIG. 3 illustrates one example of the waveforms associated with the averaging circuit 130, various changes may be made to FIGS. 2 and 3. For example, other implementations of the averaging circuit 130 could be used to achieve the same or similar results, such as when variations in the switch design or in the timing of the signals are used. As particular examples, a pulse in the $\phi_1$ signal could be delayed until slightly after the rising edge of the PWM signal, and a pulse in the ($\phi_2$ signal could arrive earlier than shown in FIG. 3. Also, instead of using the PWM signal, the gate voltage on the power switch 126 could be used, or a detector could sense the power switch 126 turning on.

Figure 4:
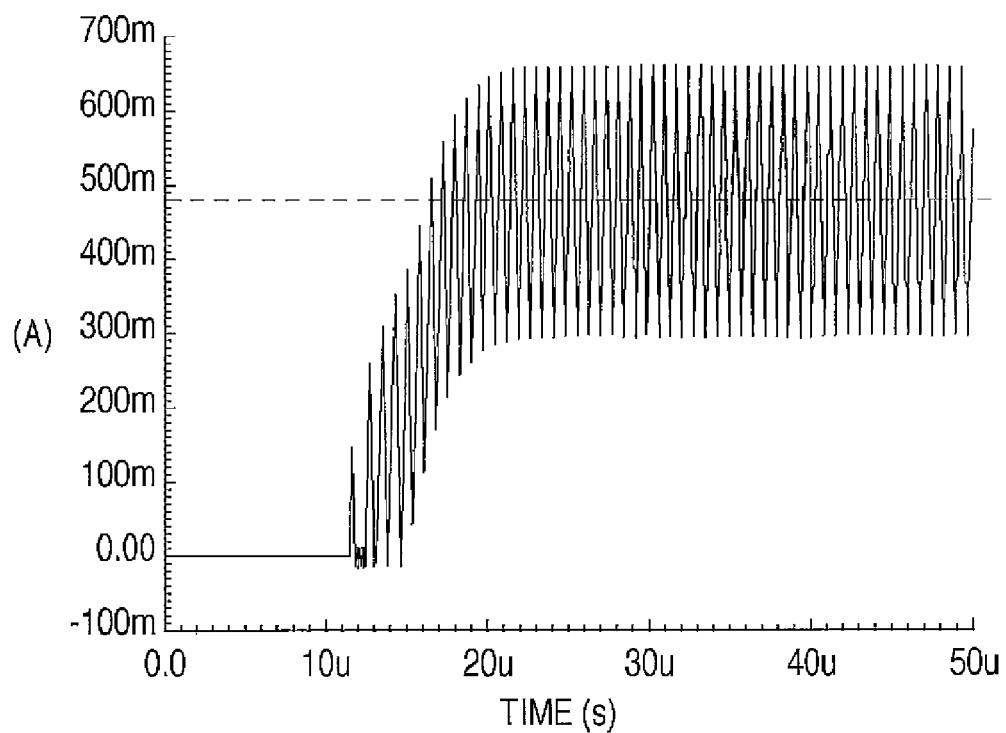
FIG. 4 illustrates an example simulated transient response associated with the system of FIG. 1 according to this disclosure.

FIG. 4 illustrates an example simulated transient response associated with the system 100 of FIG. 1 according to this disclosure. In the example shown in FIG. 4, the LED driver circuit 108 is enabled at a time of 10 μs. Within 10-15 μs, the average current through the inductor 104 is regulated to a desired value of approximately 480 mA.

As shown here, the LED driver circuit 108 can provide superior transient response, rapidly responding to changes in its operating environment. Moreover, this can be achieved by regulating the average current in the LEDs 102, which enables the LED driver circuit 108 to be used with widely varying input and output voltages and external component values (such as inductor values). Further, this is achieved without requiring the use of low-pass filters that create phase lag in the feedback path, which would slow its transient response. In addition, a transconductance of the error amplifier 110 can remain substantially constant regardless of the duty factor of the PWM signal, allowing easy compensation internally regardless of the input and output voltages being used.

The LED driver circuit 108 therefore provides a superior technique for regulating LED average current in a floating switching buck architecture, even in situations where the LED current is not readily accessible. The LED driver circuit 108 does this while circumventing disadvantages of prior approaches, such as die size limitations, transient response limitations, and restrictions in operating frequencies, input voltages, and output voltages.

Although FIG. 4 illustrates one example of a simulated transient response associated with the system 100 of FIG. 1, various changes may be made to FIG. 4. For example, the simulated transient response is associated with a specific implementation of the system 100. Other implementations could have faster or slower transient responses.

Figure 5:
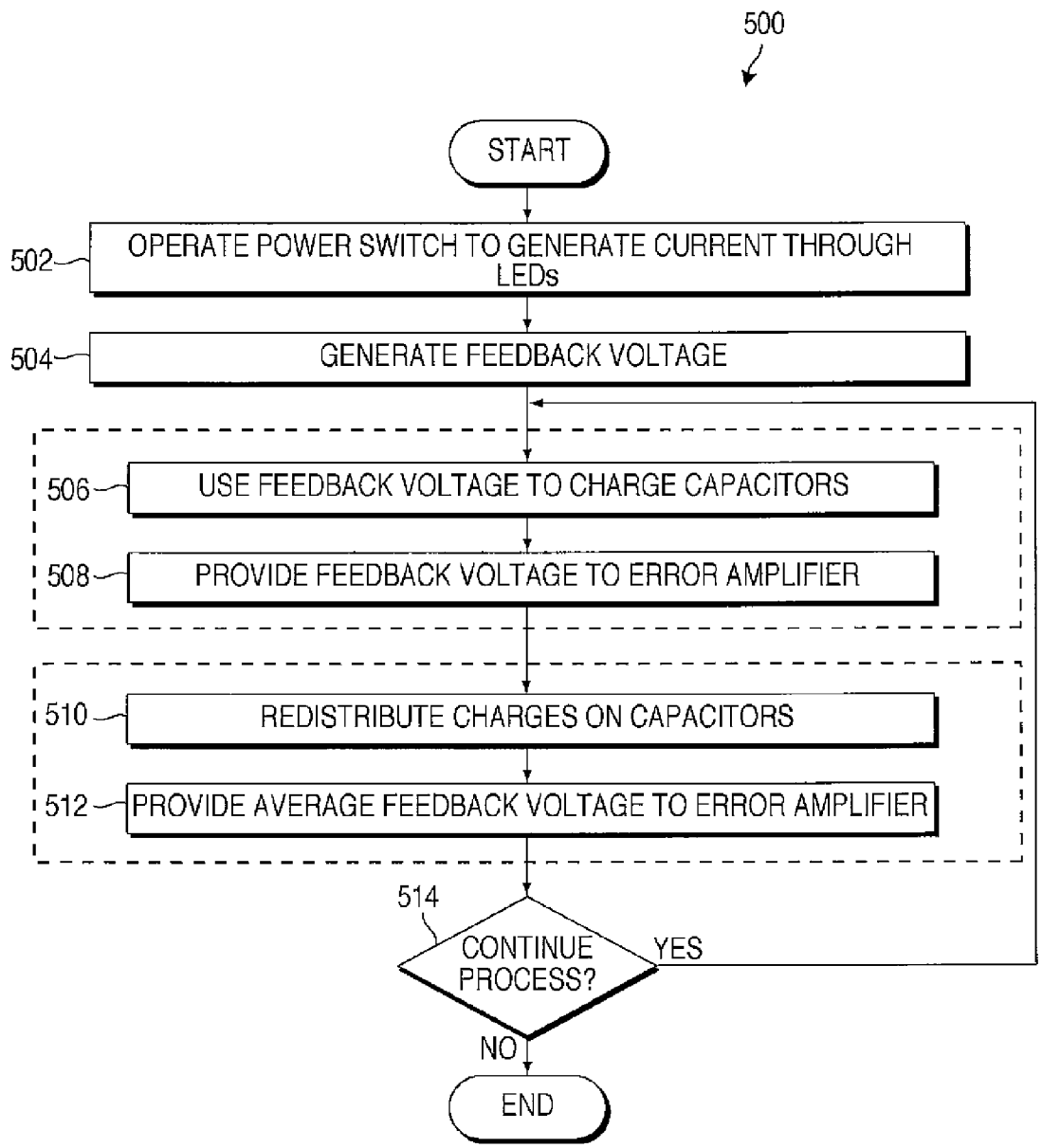
FIG. 5 illustrates an example method for buck constant average current regulation of LEDs according to this disclosure.

FIG. 5 illustrates an example method 500 for buck constant average current regulation of LEDs according to this disclosure. For ease of explanation, the method 500 is described with respect to the system 100 of FIG. 1 that includes the averaging circuit 130 of FIG. 2.

A power switch is operated to generate current through one or more LEDs at step 502. This could include, for example, the LED driver circuit 108 generating a PWM signal that causes the driver 124 to turn the switch 126 on and off. This causes a current to flow through the LEDs 102. The duty cycle of the PWM signal can be adjusted by the LED driver circuit 108 to control the amount of illumination generated by the LEDs 102. A feedback voltage is generated at step 504. This could include, for example, using the current flowing through the LEDs 102 to generate a voltage across the resistor 128.

Control of the current through the LEDs can then occur in two repeating phases. In a first phase, the feedback voltage is used to charge multiple capacitors at step 506, and the feedback voltage is provided to an error amplifier at step 508. This could include, for example, asserting the $\phi_1$ signal to briefly close the switch 202 and asserting the PWM'/$\phi_2$ signal to close the switch 204, charging the capacitors 212-214. In a second phase, charges on the capacitors are redistributed at step 510, and an average feedback voltage stored on the capacitors is provided to the error amplifier at step 512. This could include, for example, de-asserting the PWM and $\phi_2$ signals to close the switch 206, where the switch 208 is already closed. This causes the charge on the capacitors 212-214 to redistribute equally and represent the average of the feedback voltage $V_{FB}$.

If the process continues at step 514, another iteration of steps 506-512 may occur. This may continue for any length of time to regulate the average current through the LEDs 102.

Although FIG. 5 illustrates one example of a method 500 for buck constant average current regulation of LEDs, various changes may be made to FIG. 5. For example, while shown as a series of steps, various steps in FIG. 5 may overlap, occur in parallel, or occur in a different order.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. An apparatus comprising:
pulse width modulation (PWM) circuitry configured to generate a PWM signal to control a current flowing through a load;
a power switch configured to control the current flowing through the load based on the PWM signal; and
averaging circuitry configured to:
provide a varying feedback voltage to the PWM circuitry during a first phase of a repetitive control cycle, the feedback voltage based on the current flowing through the load; and
provide an average of the varying feedback voltage from the first phase of the repetitive control cycle to the PWM circuitry during a second phase of the repetitive control cycle
the averaging circuitry including:
first and second switches coupled to a first capacitor; and
third and fourth switches coupled to a second capacitor, the third and fourth switches coupled in parallel with the first and second switches,
wherein the second switch is configured to receive an inverted control signal of the third switch,
wherein the control signal of the third switch is derived from a logical combination of the PWM signal and an inversion of a clock signal,
wherein
a) the first switch is closed and then opened and the second switch is opened in the first phase to charge the first capacitor;
b) the third is closed in the first phase to charge the second capacitor; and
c) the first switch is opened, the second switch is closed, and the third switch is opened to redistribute charges on the first and second capacitors and generate the average of the feedback voltage.

2. The apparatus of claim 1, wherein:
the averaging circuitry is configured to operate so that the varying feedback voltage increases from a lower voltage at a beginning of the first phase of the repetitive control cycle to a higher voltage at an end of the first phase of the repetitive control cycle; and the averaging circuitry is configured to operate so that the average of the feedback voltage comprises a voltage between the lower and higher voltages during the second phase of the repetitive control cycle.

3. The apparatus of claim 1, wherein the first switch is coupled to receive a first control signal, the third switch is coupled to receive a second control signal, and the second switch is coupled to receive an inverted second control signal.

4. The apparatus of claim 1, wherein the PWM circuitry comprises:
   an error amplifier configured to receive a reference voltage, the error amplifier coupled to the averaging circuitry;
   a comparator configured to compare an output signal from the error amplifier and a ramp voltage; and
   PWM control logic configured to generate the PWM signal based on an output signal from the comparator.

5. The apparatus of claim 1, wherein the fourth switch is configured to be permanently turned on.

6. The apparatus of claim 1, wherein the clock signal is a phase delayed clock signal of a first clock signal, and the first clock signal is asserted as triggered by a rising edge of the PWM signal.

7. The apparatus of claim 1, wherein the clock signal is asserted as triggered preceding falling edges of the PWM signal.

8. The apparatus of claim 4, wherein the average of the feedback voltage is referenced to the reference voltage received by the error amplifier during both the first and second phases of the repetitive control cycle.

9. A system comprising:
   one or more light emitting diodes (LEDs); and
   a driver circuit comprising:
      pulse width modulation (PWM) circuitry configured to generate a PWM signal to control a current flowing through the one or more LEDs;
      a power switch configured to control the current flowing through the one or more LEDs based on the PWM signal; and
      averaging circuitry configured to:
         provide a varying feedback voltage to the PWM circuitry during a first phase of a repetitive control cycle, the feedback voltage based on the current flowing through the one or more LEDs; and
         provide an average of the varying feedback voltage from the first phase of the repetitive control cycle to the PWM circuitry during a second phase of the repetitive control cycle,
      the averaging circuitry including:
         first and second switches coupled to a first capacitor; and
         third and fourth switches coupled to a second capacitor, the third and fourth switches coupled in parallel with the first and second switches,
         wherein the second switch is configured to receive an inverted control signal of the third switch,
         wherein the control signal of the third switch is derived from a logical combination of the PWM signal and an inversion of a clock signal,
      wherein
         a) the first switch is closed and then opened and the second switch is opened in the first phase to charge the first capacitor;
         b) the third is closed in the first phase to charge the second capacitor; and
         c) the first switch is opened, the second switch is closed, and the third switch is opened to redistribute charges on the first and second capacitors and generate the average of the feedback voltage.

10. The system of claim 9, wherein:
    the averaging circuitry is configured to operate so that the varying feedback voltage increases from a lower voltage at a beginning of the first phase of the repetitive control cycle to a higher voltage at an end of the first phase of the repetitive control cycle; and
    the averaging circuitry is configured to operate so that the average of the feedback voltage comprises a voltage between the lower and higher voltages during the second phase of the repetitive control cycle.

11. The system of claim 9, wherein the first switch is coupled to receive a first control signal, the third switch is coupled to receive a second control signal, and the second switch is coupled to receive an inverted second control signal.

12. The system of claim 9, wherein the PWM circuitry comprises:
    an error amplifier configured to receive a reference voltage, the error amplifier coupled to the averaging circuitry;
    a comparator configured to compare an output signal from the error amplifier and a ramp voltage; and
    PWM control logic configured to generate the PWM signal based on an output signal from the comparator.

13. The system of claim 9, wherein the driver circuit has a transient response time between approximately 10 μs and approximately 15 μs.

14. The system of claim 9, further comprising:
    an inductor coupled between the one or more LEDs and the power switch.

15. The system of claim 9, wherein the fourth switch is configured to be permanently turned on.

16. The system of claim 9, wherein the clock signal is a phase delayed clock signal of a first clock signal, and the first clock signal is asserted as triggered by a rising edge of the PWM signal.

17. The system of claim 9, wherein the clock signal is asserted as triggered preceding falling edges of the PWM signal.

18. The system of claim 12, wherein the average of the feedback voltage is referenced to the reference voltage received by the error amplifier during both the first and second phases of the repetitive control cycle.

19. A method comprising:
    generating a varying feedback voltage based on current flowing through a load;
    generating an average of the varying feedback voltage;
    during a first phase of a repetitive control cycle, controlling the current flowing through the load based on the feedback voltage; and
    during a second phase of the repetitive control cycle, controlling the current flowing through the load based on the average of the feedback voltage, the average of the feedback voltage comprising an average of the feedback voltage from the first phase of the repetitive control cycle
    wherein
    first and second switches are coupled to a first capacitor;
    third and fourth switches are coupled to a second capacitor, the third and fourth switches also coupled in parallel with the first and second switches;
       wherein the second switch is configured to receive an inverted control signal of the third switch,
       wherein the control signal of the third switch is derived from a logical combination of the PWM signal and an inversion of a clock signal,
    wherein a) the first switch is closed and then opened and the second switch is opened in the first phase to charge the first capacitor;
b) the third is closed in the first phase to charge the second capacitor; and
c) the first switch is opened, the second switch is closed, and the third switch is opened to redistribute charges on the first and second capacitors and generate the average of the feedback voltage.

20. The method of claim 19, wherein:
the varying feedback voltage increases from a lower voltage at a beginning of the first phase of the repetitive control cycle to a higher voltage at an end of the first phase of the repetitive control cycle; and
the average of the feedback voltage comprises a voltage between the lower and higher voltages during the second phase of the repetitive control cycle.

21. The method of claim 19, wherein the average of the feedback voltage is referenced to a reference voltage during both the first and second phases of the repetitive control cycle, the reference voltage higher than a ground voltage.

22. The method of claim 19, wherein the clock signal is a phase delayed clock signal of a first clock signal, and the first clock signal is asserted as triggered by a rising edge of the PWM signal, and the clock signal is asserted as triggered preceding falling edges of the PWM signal.

* * * * *